March 10, 1931. A. T. GREEN ET AL 1,796,147
GROUND ANCHOR FOR GUY WIRES
Filed April 23, 1928 2 Sheets-Sheet 2
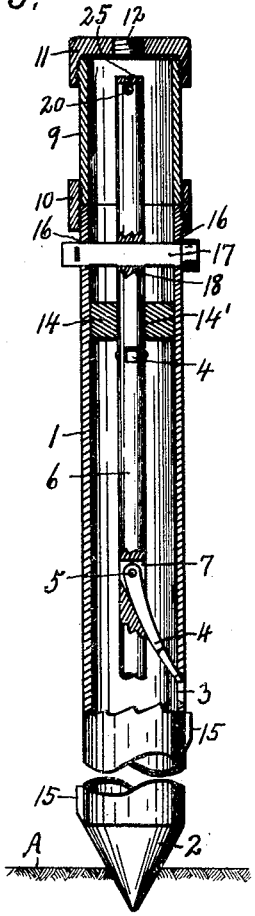
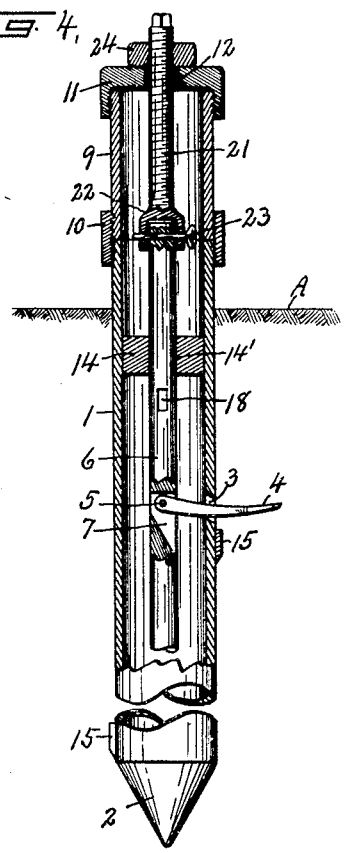
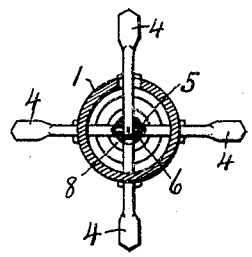

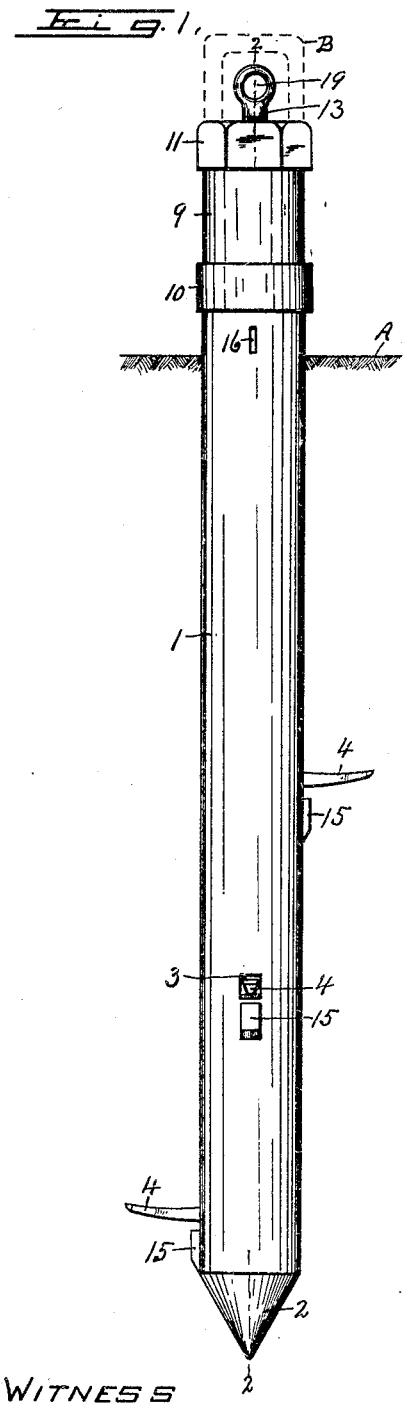
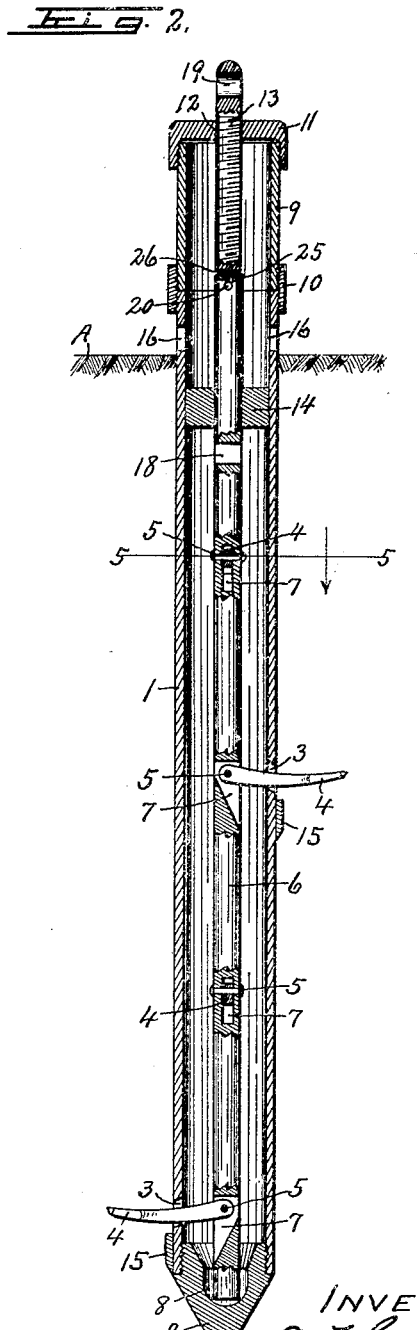

Patented Mar. 10, 1931                                                           1,796,147

UNITED STATES PATENT OFFICE

ANDREW T. GREEN AND ROBERT G. SHAW, OF ORISKANY FALLS, NEW YORK

GROUND ANCHOR FOR GUY WIRES

Application filed April 23, 1928. Serial No. 272,145.

This invention relates to a ground anchor for guy wires and analagous uses and is somewhat similar to that set forth in our Patent No. 1,724,401, issued August 13, 1929, insofar that the fluke operating rod is movable vertically within a tubular well-point or case which with the fluke operating rod therein is adapted to be driven into the ground to the required depth for projecting the flukes into the solid earth.

In the patent referred to the flukes are opened or projected outwardly through openings in the tube or casing by upward movement of the operating rod from a normal down position while in the present application the flukes are projected outwardly through an opening in the tubular casing by downward movement of the operating rod from a normal elevated position, the object of which is to utilize the weight of rod and fluke in addition to the downward pressure upon the rod for unfolding the flukes outwardly and thereby to reduce the pressure required for effecting the unfolding operation.

Another object of opening the flukes by the downward movement of the operating rod is to permit the use of a rigid connection between the rod and its operating means in place of the flexible connection shown in the patent referred to and also to facilitate the operation of driving the tubular case into the ground.

A further object is to provide movable means for holding the fluke operating rod and flukes thereon in their normal elevated positions while the tubular case is being driven into the ground.

Another object is to provide the tubular case with peripheral lugs underlying the fluke openings therein for channeling the ground in advance of the flukes as the tubular case is driven into the ground and thereby to facilitate the initial entrance of the flukes into the soil when the operating rod is forced downwardly for projecting the flukes outwardly.

Other objects and uses relating to specific parts of the device will be brought out in the following description.

In the drawings:—

Figure 1 is a side elevation of a ground anchor driven the required distance into the earth with the rod in its lowermost position and the flukes unfolded.

Figure 2 is a longitudinal vertical sectional view of the same device as shown in Figure 1.

Figure 3 is a vertical sectional view, partly in elevation and partly broken away, showing the rod as elevated and the flukes withdrawn from the ground into the interior of the casing, together with the means for locking the rod in its elevated position.

Figure 4 is a vertical sectional view, partly in elevation and partly broken away, similar to Figure 3, except that the rod is in its lowermost position and the flukes unfolded or projected outwardly together with the means attached to the upper end of the rod for drawing the same upwardly and incidentally to withdraw the flukes from the ground within the tubular case.

Figure 5 is a transverse sectional view taken in the plane of line 5—5, Figure 2.

As illustrated, this ground anchor comprises a cylindrical tubular case —1— such as a wrought iron pipe or its equivalent, having its lower end provided with a pointed section —2— to facilitate the entrance of the tubular case into the ground by pressure applied to the upper end thereof in a manner hereinafter described.

The casing —1— is provided with openings —3— through the peripheral walls thereof for receiving a corresponding number of flukes —4— which are pivotally attached at —5— to an operating rod —6—.

This rod —6— is reciprocally movable vertically within the tubular case coaxial therewith and is preferably made of wrought iron or equivalent material of sufficient strength to perform the work required but of considerably less diameter than the interior diameter of the tubular case so as to afford ample clearance space for the folding of the flukes —4— within the case when the rod is elevated to the position shown in Figure 3 for withdrawing the flukes from the ground.

As illustrated, the rod is provided with transverse slots —7— therethrough and preferably arranged in vertically spaced relation for receiving the adjacent ends of the flukes —4—, alternate slots being preferably disposed at right angles to each other so that the flukes may be projected through their respective openings —3— into the ground in uniformly spaced relation circumferentially around the axis of the tubular casing and from four sides thereof or at right angles to each other.

In like manner, the openings —3— in the tubular casing —1— are disposed in radial alinement with their respective flukes —4— and, therefore, will be spaced longitudinally so that alternate openings will be at right angles to each other.

The length of the rod —6— is approximately equal to the length of the tubular casing —1— and when in its lowermost position for opening the flukes the lower end thereof will rest in a socket —8— in the downwardly tapered point —2— as shown in Figure 2 while the upper end will be disposed in approximately the horizontal plane of the upper end of the casing —1— for a purpose hereinafter described.

A tubular extension —9— of substantially the same diameter as the casing —1— is removably secured to the upper end of the casing by means of a connecting nipple or union —10— which is threaded internally and engaged with a correspondingly threaded upper end of the casing to form a continuation thereof when the two parts are assembled.

The upper end of the extension —9— is threaded externally for receiving a cap nut —11— which is screwed thereon and constitutes a driving head adapted to receive the impact of a sledge or other pressure device for forcing the tubular casing —1— into the ground to the required depth, said cap nut being provided with a central threaded aperture —12— for receiving a rod-operating screw —13—, Figures 1 and 2.

A bushing —14— is brazed or otherwise secured to and within the casing —1— some distance below the upper end thereof and also some distance above the uppermost fluke —4— when the rod is raised to its fluke-folding position as shown in Figure 3, said bushing being provided with a central opening —14'— for guiding the rod —6— in its vertical movements.

The tubular case —1— is provided with a plurality of relatively short radially projecting peripheral lugs —15—, one for each fluke and each located directly below its corresponding fluke and the adjacent opening —3— to form channels in the earth as the tubular case is driven into the ground, said channels serving to facilitate the initial entrance of the corresponding flukes into the earth as the rod —6— is lowered from its extreme elevated position, as shown in Figure 3, to its extreme lower position as shown in Figure 2, the lower end edges of the lugs —15— being beveled downwardly and inwardly to ease their entrance into the ground.

The peripheral wall of the upper end of the tubular case —1— is provided with diametrically opposite openings —16— which, when the case is driven to the desired distance into the ground, will be above the surface —A— thereof for receiving a wedge or key —17—, Figure 3, presently described.

The rod —6— is also provided with a diametrically extending opening or keyway —18— which is located between the uppermost fluke —4— and upper end of the rod and when registered with the opening —16—, as, for example, when the rod is moved to its extreme upward position for withdrawing the flukes from the ground, is adapted to receive the key —17— for locking the rod and tubular case against relative endwise movement or rather for locking the rod against downward movement when the casing is driven into the ground.

For example, in Figure 3, the parts of the ground anchor are adjusted and set ready for driving the same into the ground, the rod —6— being elevated to its extreme upward position for withdrawing the flukes —4— into the tubular case —1— thereby bringing the opening —18— in the rod into transverse alinement with the keyways —16—.

The key —17— is shown in this figure as being inserted through the registering openings for holding the rod in its extreme upward position and incidentally holding the flukes wholly within the periphery of the tubular case —1—.

It will also be noted that the upper end of the rod —6— projects into the extension —9— but terminates below the upper end thereof and, therefore, below the cap nut —11— which is screwed upon the upper end of the extension —9— and serves as a means for receiving pressure or impact of a suitable instrument for forcing the tubular case and parts mounted thereon downwardly into the solid earth, the screw —13— being preferably withdrawn during this latter operation.

It will be evident, however, that the screw —13— may remain in place while the casing and parts thereon are being driven into the ground by simply using a hollow driving tool —B— as shown by dotted lines in Figure 1 for engaging the top of the cap nut —11— around the upper end of the screw —13—.

If, for any reason, it should be desired to withdraw the anchor from the ground after it has been inserted the required distance or only part way therein and while the key —17— is still in its locking position for holding the rod —6— and its flukes —4— in their uppermost positions the screw —13— may be screwed into the threaded socket as —12— in the cap nut —11— a sufficient distance to form a firm connection therewith whereupon a suitable hoisting device having means for attachment to the terminal eye —19— may be connected to said eye and the hoisting device actuated to effect the desired withdrawal of the tubular case from the ground.

This provision is particularly important when the points of the casing encounters rock or other serious obstructions to its entrance into the ground necessitating the withdrawal and replacement of the anchor to some other more favorable position.

After the anchor has been driven into the ground in the manner described the key —17— may be withdrawn by hand from the openings —16— and —18— after which the screw —13— may be operated in the threaded aperture of the cap nut —11— to engage the upper end of the rod —6— and to force the same downwardly to its extreme lower position indicated in Figure 2 thereby causing the free ends of the flukes —4— to ride against and to be deflected outwardly or laterally by the lower walls of their respective openings —3— until the flukes assume substantially horizontal positions as indicated in Figures 1, 2 and 4 and also in Figure 5.

In case it should become necessary to withdraw the anchor from the ground after the flukes have been unfolded thereinto, suitable means is provided for raising the rod —6— to withdraw the flukes inwardly within the tubular case and for this purpose the upper end of the rod is provided near its upper end with a diametrically extending opening —20— adapted to receive any suitable hoisting device such, for example, as a screw —21—, Figure 4.

The lower end of this screw is provided with a socketed head —22— adapted to fit over the upper end of the rod —6—, said head being provided with diametrically opposite openings adapted to register with the opening —20— and arranged to receive a locking pin —23— by which the two parts —6— and —21— may be locked to each other. The screw —21— is of smaller diameter than the threaded opening —12— in the cap nut so as to slide freely therethrough but is adapted to extend some distance above said cap to be engaged by a nut —24—, Figure 4.

It is now evident that when the lower end of the head —22— is interlocked with the upper end of the rod —6— by means of the locking pin —23— the nut —24— may be rotated against the upper end of the cap —11— in engagement with the threaded portion of the screw —21— for raising said screw and rod —6— a sufficient distance to withdraw the flukes —4— wholly within the interior of the tubular case —1—.

We do not wish, however, to limit ourselves to this particular type of lifting device for the fluke-supporting rod —6— for the reason that any hoisting device operatively attached in the opening —20— on the upper end of the rod could serve the same purpose.

The upper end face of the rod —6— is provided with a central depressed bearing —25— adapted to be engaged by a corresponding projection —26— on the lower end face of the screw —13—, the object of which is to cause the screw to center itself upon and against the upper end of the rod —6— while forcing the same downwardly for projecting the flukes into the ground.

The object in making the extension —9— removable from the casing —1— is to facilitate the attachment of the hoisting device as —21— to the upper end of the rod or in the opening —20— which will always be more or less above the horizontal plane of the upper end of the tubular casing —1— for accessibility when the extension —9— is removed.

It is to be understood, however, that the removability of the extension —9— to permit the attachment of the hoisting device to the upper end of the rod —6— is not imperative since it will be evident that any suitable implement, such as a wire of sufficient strength, might be inserted though the opening —12— and hooked into the aperture —25— and the outer end of the wire attached to any available hoisting apparatus, not shown, it being understood that under such conditions the screw —13— would be removed from the aperture —12—.

It will be observed that the openings —3— in the peripheral wall of the tubular case —1— are arranged spirally or in staggered relation lengthwise thereof preferably in equally spaced relation so as to distribute the resistance of the ground engaging with the outwardly projected flukes more evenly around the axis of the casing against withdrawal of the tube from the ground when the anchor is set to take the stresses of a guy wire or other object.

The openings —3— in the peripheral walls of the casing —1— are constructed and arranged in such relation to their respective flukes that when the rod —6— is forced downwardly the free ends of the flukes will slide against and be forced outwardly by the lower walls of the openings. On the other hand, when the rod —6— is raised the free ends of the flukes will slide against and be folded inwardly by the upper walls of the openings so that the unfolding and folding of the flukes is positive and dependable as the rod is reciprocated endwise.

What we claim is:—

In a ground anchor of the character described, a tubular case having a tapered section at its lower end and provided with a series of fluke-receiving openings arranged in longitudinally spaced staggered relation lengthwise of the case, a rod reciprocally movable endwise within the tubular case and provided with folding flukes arranged in longitudinally spaced staggered relation and each having its free end movable in its corresponding opening, the upper end of the casing being provided with a removable extension and a cap on the upper end of the extension, said cap having an opening in its top, said rod having each end thereof extending some distance beyond the flukes and provided with a diametrically extending opening near the upper end thereof, and means for moving the rod upwardly to fold the flukes inwardly comprising a screw member extending through the opening in the cap and having one end operably connected with the upper end of the rod at said opening and provided with a nut positioned adjacent the outer face of said cap.

In witness whereof we have hereunto set our hands this 11th day of April, 1928.

ANDREW T. GREEN.
ROBERT G. SHAW.